United States Patent [19]

Asanae et al.

[11] Patent Number: 4,873,540

[45] Date of Patent: Oct. 10, 1989

[54] IMAGE RECORDING METHOD

[75] Inventors: Masumi Asanae, Kumagaya; Kimura Fumio, Isezaki, both of Japan

[73] Assignee: Hitachi Metals, Ltd., Tokyo, Japan

[21] Appl. No.: 202,591

[22] Filed: Jun. 3, 1988

Related U.S. Application Data

[63] Continuation-in-part of Ser. No. 182,116, Apr. 15, 1988, abandoned.

[30] Foreign Application Priority Data

Apr. 15, 1987 [JP] Japan .................................. 62-92327

[51] Int. Cl.4 .............................................. G01D 15/00

[52] U.S. Cl. ................................ 346/160.1; 346/153.1

[58] Field of Search ...................... 346/105, 106, 160.1, 346/74.2, 153.1, 1.1; 358/300, 301

[56] References Cited

U.S. PATENT DOCUMENTS 4,734,720 3/1988 Isii et al. ........................... 346/160.1

4,739,348 4/1988 Ando et al. ....................... 346/160.1

4,763,143 8/1988 Ohba et al. ....................... 346/153.1

*Primary Examiner*—Arthur G. Evans

*Attorney, Agent, or Firm*—Finnegan, Henderson, Farabow, Garrett & Dunner

[57] ABSTRACT

A method of forming an image comprising the steps of: (a) arranging a plurality of recording electrodes opposite to a movable recording member having an insulating layer on the surface, thereby forming a recording area between the insulating layer and the recording electrodes; (b) supplying to the recording area magnetic toner consisting of toner particles composed of a binder resin and magnetic powder, the toner particles being coated with particles made of a conductive material and further coated thereon with particles made of an insulating material so that it has a bulk resistivity of $10^6\Omega$.cm or less and a surface resistivity of $10^5$–$10^{15}\Omega$.cm; and (c) applying signal voltage corresponding to the image of the recording electrodes, thereby forming a toner image on the surface of the recording member.

4 Claims, 1 Drawing Sheet

IMAGE RECORDING METHOD

This is a continuation of application Ser. No. 07/182,116 filed Apr. 15, 1988, now abandoned.

BACKGROUND OF THE INVENTION

The present invention relates to a method of forming an image with magnetic toner directly on a surface of a recording medium by means of a large number of needle electrodes operable in response to an electric image signal.

Conventionally, the formation of an image in an electrophotographic apparatus is generally carried out by using a photosensitive drum as an image-bearing medium, uniformly charging the surface of the photosensitive drum by means of a corona discharge unit, exposing the photosensitive drum surface to form an electrostatic latent image, bringing a magnetic developer into contact with the image-bearing photosensitive drum surface by a magnetic brush method, etc. to form a toner image, transferring it onto a recording sheet, and fixing the toner image thereon.

Recently, however, a method of forming a visual image with toner directly on a dielectric member made of alumite or other materials by a plurality of needle electrodes without using a photosensitive drum was proposed (for instance, see U.S. Pat. No. 3,816,840). Specifically speaking, a drum made of aluminum, etc. and coated with an alumite layer of about 10 $\mu m$ in thickness contains a permanent magnet near an inner surface of the drum, and a container containing conductive magnetic toner is arranged near an upper part of the drum in opposition to the permanent magnet in the drum. Part of this toner container is provided with a magnetic plate and a plurality of needle electrodes opposing to the drum and the permanent magnet contained therein. A magnetic field generated by the permanent magnets serves to form toner chains between the alumite layer and the electrodes, bringing part of the toner chains into contact with the alumite layer. Because of this arrangement, when an image-forming electric signal, for instance, a pulse voltage of about 50V is selectively applied to a plurality of needle electrodes, the toner being in contact with the alumite layer receives a Coulomb force, and the toner is selectively attracted onto the alumite layer on the outer surface of the drum under this Coulomb force while the drum is rotating, thereby effecting development. The toner image is then electrostatically transferred onto a plain paper and then fixed thereon to provide a copy image.

It has been found, however, that various problems take place when conventional magnetic toner is used without any treatment to form a toner image directly on a dielectric medium as mentioned above. Specifically, with conductive magnetic toner (for instance, U.S. Pat. Nos. 3,639,245, 4,189,390 and 4,482,623), a toner image is blurred when transferred because such magnetic toner has a low resistivity (bulk resistivity of $10^2$–$10^3\Omega$.cm or so). On the other hand, when semiconductive or insulating magnetic toner is used, a high image density cannot be obtained when developed, because the toner has a high resistivity of $10^9$–$10^{16}\Omega$.cm or so. Conductive fine particles such as carbon black can be added to magnetic toner particles to decrease the internal resistance thereof, but this solution requires a large amount of carbon black, leading to extremely poor fixability.

OBJECT AND SUMMARY OF THE INVENTION

Therefore, an object of the present invention is to provide a method of forming an image without suffering from the above problems, namely, to provide a method of forming an image having high density and resolution without blurring and fogging.

As a result of intense research in view of the above object, the inventors have found that the above object can be achieved by coating magnetic toner particles with conductive particles first and then with non-conductive particles.

Thus, the method of forming an image according to the present invention comprises the steps of:

(a) arranging a plurality of recording electrodes opposite to a movable recording member having an insulating layer on the surface, thereby forming a recording area between the insulating layer and the recording electrodes;

(b) supplying to the recording area magnetic toner consisting of toner particles composed of a resin and magnetic powder, the toner particles being coated with particles made of a conductive material and further coated thereon with particles made of an insulating material so that it has a bulk resistivity of $10^6\Omega$.cm or less and a surface resistivity of $10^5$–$10^{15}\Omega$.cm; and (c) applying signal voltage corresponding to the image to the recording electrode, thereby forming a toner image on the surface of the recording member.

DETAILED DESCRIPTION OF THE INVENTION

Figure 1:
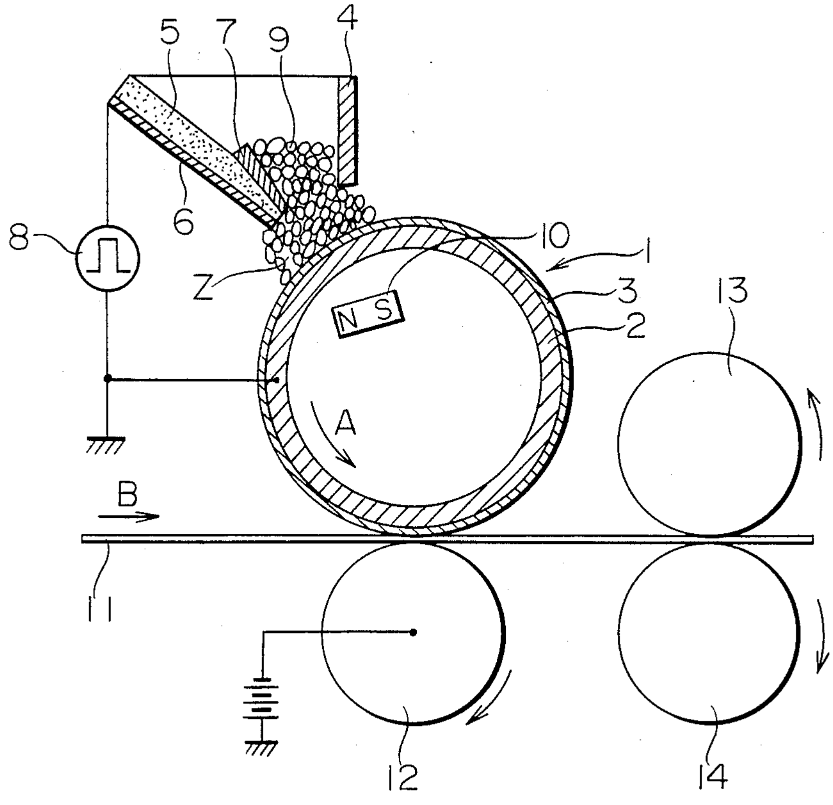
FIG. 1 cross-sectional view of a recording apparatus for out the method of the present invention.

The present invention will be explained in detail below.

Referring to FIG. 1, a recording member 1 in the form of a hollow cylinder is constituted by a conductive substrate 2 and an insulating layer 3 formed thereon. The substrate 2 is typically made of aluminum or its alloy, and its surface is subjected to alumite treatment. The insulating layer generally has a thickness of 2–100 $\mu m$. Positioned around the recording member 1 is a hopper 4 for containing magnetic toner 9. The recording member 1 is rotatable in the direction shown by the arrow A. The hopper 4 is provided with a plurality of recording electrodes 6 on the downstream side with respect to the rotational direction of the recording member 1, whereby a recording area Z is formed between tips of the recording electrodes 6 and the recording member 1. The recording electrodes 6, which are formed by a thick layer-forming process on an insulating subsrate 5 made of ceramics, etc, are aligned transversely with respect to the recording member 1. A tip of the substrate 5 on the side of the recording area is in the shape of a knife edge to which a magnetic blade 7 such as an iron plate is fixed. The magnetic blade 7 acts to concentrate the magnetic flux generated by a permanent magnet 10 fixed inside the recording member 1 onto the tips of the recording electrodes 6. A drive circuit 8 is connected to the recording electrodes 6 and the substrate 2 to apply a voltage corresponding to an image to be formed therebetween. The recording member 1 is in pressure contact with a conductive rubber roller 12 to which a bias voltage source 12 is connected in order to transfer the toner image formed on the recording member 1 onto a recording sheet 11. The recording sheet 11 bearing the transferred toner image then passes through a pair of fixing rolls 13, 14 by which the toner is strongly fixed to the sheet 11.

The apparatus is operated as follows:

First, the magnetic toner 9 supplied from the hopper 4 to the recording area Z forms chains extending along the magnetic fluxes generated from the permanent magnet 10. The toner chains thus formed close the electric gap between tips of the recording electrodes 6 and the surface (recording surface) of the recording member 1. Then the drive circuit 8 is operated to apply voltage selectively to the recording electrodes 6 in response to an image signal, so that in the toner chains in contact with the electrodes to which voltage is applied, the toner particles in contact with the recording surface are supplied with electric charge by electric current flowing through the toner chains. At the same time, electric charge of the opposite polarity to that of electric charge supplied to the toner particles is induced in a boundary between the substrate 2 and the insulating layer 3 of the recording member 1, both of the above two charges are attracted to each other by a Coulomb force. By rotation of the recording member 1 in the direction shown by the arrow A, the toner particles having electric charge are separated from the toner chains, thereby forming a toner image. On the other hand, the remaining toner chains are supplemented with toner particles from the opposite side to the electrodes 6 as the recording member 1 rotates. Thus toner chains in the same manner as mentioned above are formed again.

Incidentally, in the rotation of the recording member 1, part of the toner particles may be attached to the surface of the recording member 1 in spite of no electric charge and conveyed to a transfer region together with a toner image. This undesired toner can be easily removed by a proper magnetic means positioned on the downstream of the recording area Z with respect to the rotational direction of the recording member 1, because it is not attracted to the recording member 1 by a Coulomb force.

When the toner image supported on the recording member 1 reaches the transfer area, voltage of the opposite polarity to that of toner charge is applied to a conductive rubber roller 12 to generate an electric attraction force which makes it possible, together with pressure, to transfer the toner image onto the recording sheet 11, and the toner image is firmly fixed to the recording sheet 11 by passing between the fixing rollers 13, 14.

In the above image-forming method, investigation has been conducted to provide a high-quality image, particularly by paying attention to the magnetic toner. As a result it has been found that the formation of good image can be achieved by restricting the bulk resistivity and surface resistivity of toner within particular ranges.

The reasons for restricting them are as follows:

In the process of development, the toner particles are attracted to the recording member 1 by electric current flowing through toner chains formed by magnetic flux (toner chains serve as paths for electric current). Accordingly, the lower the bulk resistivity, the better the development of an image. On the other hand, in the process of electrostatically transferring a toner image formed on the recording member onto a paper sheet, the toner is attracted to a paper sheet by electric charge supplied to the sheet. Namely, in the process of transferring, substantially only electric chargeability on the surface of the toner particle affects the transfer characteristics of the toner. This electric chargeability largely depends on the surface resistivity of the toner. This means that without a relatively high surface resistivity, good transfer of toner image cannot be achieved. Therefore, taking into consideration both development and transfer characteristics, it is necessary that the toner has a bulk resistivity of $10^6\Omega$.cm or less and a surface resistivity of $10^5$–$10^{15}\Omega$.cm. Preferably, the bulk resistivity is $10^3$–$10^5\Omega$.cm and the surface resistivity is $10^6$–$10^{14}\Omega$.cm. Incidentally, the most preferred surface resistivity is $10^8$–$10^{13}\Omega$.cm.

To achieve the above level of resistivity, 0.5–5.0 parts by weight of conductive particles and 0.1–1.0 parts by weight of insulating particles are applied to 100 parts by weight of the toner particles.

With respect to binder resins, they may be selected properly depending on a fixing method as disclosed in U.S. Pat. No. 4,433,042.

In the case of a heat fixing method using an oven or a heat roll, thermosplastic resins such as homopolymers or copolymers of styrenes, vinyl esters, α-methylene aliphatic monocarboxylic esters, acrylonitrile, methacrylonitrile, acrylamiee, vinyl ethers, vinyl ketones, N-vinyl compounds, etc. or mixtures thereof may be used. Further, non-vinyl thermoplastic resins such as bisphenol epoxy resins, oil-modified epoxy resins, polyurethane resins, cellulose resins, polyether resins, polyester resins or their mixtures with the above vinyl resins may be used.

In the case of a pressure fixing method, pressure-sensitive resins such as higher aliphatic acids, higher aliphatic acid derivatives, higher aliphatic amides, waxes, rosins, alkyd resins, epoxy-modified phenol resins, natural resin-modified phenol resins, amino resins, silicon resins, urea resins, copolymer oligomers of acrylic acid or methacrylic acid and long-chain alkylmethacrylate or long-chain alkylacrylate, polyolefins, ethylene-vinyl acetate copolymers, ehtylene-vinyl alkyl ether copolymers, maleic anhydride copolymers, etc. may be used.

These resins may be used in desired combinations, but it should be noted that to avoid the decrease in fluidity of toner formed therefrom, resins or resin mixtures whose glass transition temperatures Tg exceed 40° C. are effectively used.

With respect to magnetic powder, they may be made of compounds or alloys containing elements showing ferromagnetism such as iron, cobalt, nickel, etc., for instance, ferrite or magnetite. To ensure uniform dispersion of the magnetic powder in the toner particle, an average particle size of the magnetic powder should be 0.01–3μm. Its content may be 10–80 weight % based on the total weight of the toner, and more preferably it is 40–75 weight %.

In addition to the above components, various pigments, dyes and other additives usable in usual dry developers may be contained, but to prevent the decrease in the development characteristics, their total content should be 10 weight % or less.

The magnetic toner of the present invention can be prepared as follows. First, starting materials are mixed while heating, solidified by cooling and pulverized and then classified to provide toner particles of a predetermined range of particle size. The resulting toner particles are coated with conductive particles and then subjected to heat treatment to fix the conductive particles on the toner surface. They are then coated with insulating particles and then heat-treated to fix the insulating particles thereto.

EXAMPLE

| | |
|---|---|
| Polyethylene wax (Mitsui Petrochemical Co., Ltd., HIWAX 400P) | 28 parts by weight |
| Ethylene-vinyl acetate copolymer (Allied Chemical, AC 400) | 12 parts by weight |
| Magnetite (Toda Kogyo K.K,, EPT 500) | 60 parts by weight |

The above materials were blended by a kneader equipped with a heat roller for 30 minutes, solidified by cooling, pulverized and classified to provide toner particles of 10–44 μm in particle size. Next, carbon black (Mitsubishi Chemical Industry Co., Ltd. #44) was added to the toner particles in a hot air flow at 120° C. so that the toner particles are uniformly coated with carbon black. Hydrophobic silica (Nippon Aerosil R 972) was added to the toner in a hot air flow in the same manner as above so that the hydrophobic silica covered the above carbon black layer of the toner particles. As Comparative Examples, the toner particles were coated with either of carbon black or silica.

Table 1 shows the bulk resistivity and surface resistivity of magnetic toner with various amounts of carbon black and silica, and the results of development test conducted under conditions shown below.

In this case, the bulk resistivity was measured by detecting the resistance of a sample (several 10 mg) contained in a hollow cylinder made of Teflon (tradename) and having an inner diameter of 3.05 mm which was produced by modifying dial gauge, by means of an insulation resistance measurement apparatus (4329A manufactured by Yokokawa-Hewlett-Packard, Ltd.) under a load of 100 g and in a DC electric field of 4 kV/cm. And the surface resistivity was measured by detecting the resistance of a sample charged into a container into which a pair of electrode plates of 1 $cm^2$ were inserted with a 1 cm-distance therebetween, while applying DC voltage of 10 V without load.

The development and fixing will now be explained. The dielectric drum was prepared from an aluminum pipe of 40 mm in outer diameter coated with an alumite layer of 10 μm in thickness. A rare earth-cobalt magnet (H 18-B manufactured by Hitachi Metals) was fixedly placed in this drum. Next with 0.1 mm distance between the needle electrodes and the alumite layer, +50V of pulse voltage was applied to the needle electrodes to form a toner image. The toner image was then transferred to a plain paper with a conductive rubber roller to which −100V was applied, and fixed under a linear pressure of 20 kg/cm. The results are shown in Table 1.

TABLE 1

| Sample No. | Additive Amount (Parts by Weight) Carbon Black | Silica | Bulk Resistivity (. cm) | Surface Resistivity (. cm) | Image Density | Resolution (Lines/mm) | Fog* | Total Evaluation |
|---|---|---|---|---|---|---|---|---|
| 1 | 2 | 0 | $10^5$ | $10^5$ | 0.4 | 4 | yes | poor |
| 2 | 2 | 0.1 | " | $10^6$ | 1.1 | 6 | no | good |
| 3 | 2 | 0.3 | " | $10^9$ | 1.1 | 6 | " | good |
| 4 | 2 | 0.5 | " | $10^{13}$ | 1.2 | 8 | " | good |
| 5 | 2 | 1.0 | " | $10^{15}$ | 1.0 | 8 | " | good |
| 6 | 2 | 1.5 | " | $10^{16}$ | 0.8 | 6 | " | fair |
| 7 | 1.3 | 0.3 | $10^7$ | $10^9$ | 0.8 | 6 | " | fair |
| 8 | 1.5 | 0.3 | $10^6$ | " | 1.3 | 6 | " | good |
| 9 | 3.0 | 0.5 | $10^3$ | " | 1.3 | 6 | " | good |
| 10 | 4.0 | 1.0 | $10^2$ | " | 1.4 | 6 | " | good |
| 11 | 0 | 0.5 | $10^{13}$ | $10^{15}$ | 0.3 | 4 | yes | poor |

Note:
*yes: There are fogs.
no: No fog.

As is clear from Table 1, when the bulk resistivity was $10^6$Ω.cm or less and the surface resistivity was $10^6$–$10^{15}$.cm (Nos. 2–5, 8–10), high image density and resolution were obtained, providing high-quality image with substantially no fog. On the other hand, when the surface resistivity was too low (No. 1), both image density and resolution were low, and the fogging appeared. And when the surface resistivity was too high (No. 6) or when the bulk resistivity was too high (No. 7), low image density was obtained. And in the case of low bulk resistivity (No. 11) the image density and resolution were low and the fogging appeared.

In this example, carbon black was used as a conductive material and silica was used as an insulating material. It should be noted, however that the conductive materials and the insulating materials are not restricted to carbon black and silica, and that other conductive materials such as metal powder of Ni, Al, etc. and other insulating materials such as inorganic fine powder of $Al_2O_3$, $TiO_2$, etc. may be used. In sum, as long as there is no chemical reaction therebetween and also as long as there is no interference with the properties of the other constituent materials, any conductive materials and insulating materials may be properly used.

As mentioned above in detail, the method of the present invention which directly forms a toner image on the recording member with recording electrodes can provide the image with high density and resolution without blurring and fogging.

What is claimed is:

1. A method of forming an image comprising the steps of:

(a) arranging a plurality of recording electrodes opposite to a movable recording member having an insulating layer on the surface, thereby forming a recording area between said insulating layer and said recording electrodes;

(b) supplying to said recording area magnetic toner, said supplying step including the step of selecting magnetic toner consisting of toner particles composed of a binder resin and magnetic powder, said toner particles being coated with particles made of a conductive material and further coated thereon with particles made of an insulating material so that it has a bulk resistivity of $10^6\Omega$.cm or less and a resistivity of $10^5$–$10^{15}\Omega$.cm; and (c) applying signal voltage corresponding to said image to said recording electrodes, thereby forming a toner image on the surface of said recording member.

2. The method of forming an image according to claim 1, wherein said magnetic toner is coated with 0.5–5.0 parts by weight of carbon black and 0.1–1.0 parts by weight of silica per 100 parts by weight of said toner particles.

3. The method of forming an image according to claim 1 wherein said selecting step includes selecting a magnetic toner having a bulk resistivity of $10^3 10^5\Omega$.cm and a surface resistivity of $10^6 10^{14}\Omega$.cm.

4. The method of forming an image according to claim 3 wherein said selecting step includes selecting a magnetic toner having a surface resistivity of $10^8 10^{13}\Omega$.cm.

* * * * *

UNITED STATES PATENT AND TRADEMARK OFFICE

CERTIFICATE OF CORRECTION

PATENT NO. : 4,873,540

DATED : October 10, 1989

INVENTOR(S) : MASUMI ASANAE ET AL.

It is certified that error appears in the above-identified patent and that said Letters Patent is hereby corrected as shown below:

Title page, please correct the coinventor's name to read

--FUMIO KIMURA--

Signed and Sealed this

Twelfth Day of June, 1990

*Attest:*

HARRY F. MANBECK, JR.

*Attesting Officer*

*Commissioner of Patents and Trademarks*